United States Patent [19]

Imazeki et al.

[11] Patent Number: 4,600,527

[45] Date of Patent: Jul. 15, 1986

[54] LIQUID CRYSTAL COMPOSITION

[75] Inventors: Shuji Imazeki; Akio Mukoh; Mikio Sato, all of Ibaraki; Masaharu Kaneko; Tomio Yoneyama, both of Kanagawa; Junko Iwanami, Kanagawa, all of Japan

[73] Assignees: Mitsubishi Chemical Industries; Hitachi Ltd., both of Tokyo, Japan

[21] Appl. No.: 465,391

[22] Filed: Feb. 10, 1983

[30] Foreign Application Priority Data

Feb. 10, 1982 [JP] Japan .................. 57-20129

[51] Int. Cl.⁴ .................. C09K 3/04; G02F 1/13
[52] U.S. Cl. .................. 252/299.1; 350/349; 534/577
[58] Field of Search .................. 252/299.1; 350/349; 534/577

[56] References Cited

U.S. PATENT DOCUMENTS

| | | | |
|---|---|---|---|
| 4,128,496 | 12/1978 | Cole, Jr. et al. | 252/299.1 |
| 4,137,193 | 1/1979 | Osman et al. | 252/299.1 |
| 4,145,114 | 3/1979 | Coates et al. | 252/299.1 |
| 4,184,750 | 1/1980 | Bloom et al. | 252/299.1 |
| 4,308,161 | 12/1981 | Aftergut et al. | 252/299.1 |
| 4,308,162 | 12/1981 | Cole, Jr. et al. | 252/299.1 |
| 4,308,163 | 12/1981 | Aftergut et al. | 252/299.1 |
| 4,308,164 | 12/1981 | Aftergut et al. | 252/299.1 |
| 4,350,603 | 9/1982 | Aftergut et al. | 252/299.1 |
| 4,359,398 | 11/1982 | Cole, Jr. et al. | 252/299.1 |
| 4,395,350 | 7/1983 | Doller et al. | 252/299.1 |
| 4,401,369 | 8/1983 | Jones | 252/299.1 |
| 4,411,812 | 10/1983 | Aftergut et al. | 252/299.1 |
| 4,426,312 | 1/1984 | Claussen | 252/299.1 |
| 4,519,935 | 5/1985 | Claussen | 252/299.1 |

FOREIGN PATENT DOCUMENTS

| | | | |
|---|---|---|---|
| 55842 | 7/1982 | European Pat. Off. | 252/299.1 |
| 67354 | 12/1982 | European Pat. Off. | 252/299.1 |
| 76633 | 4/1983 | European Pat. Off. | 252/299.1 |
| 98522 | 1/1984 | European Pat. Off. | 252/299.1 |
| 56-57850 | 5/1981 | Japan | 252/299.1 |

OTHER PUBLICATIONS

CA., vol. 100; 51232t (1984); citing RO-76,956, Jun. 30, 1981.
CA., vol. 100; 8488u (1984); citing RO-76,871, Aug. 30, 1981.
Cognard, J., et al., Mol. Cryst. Liq. Cryst., vol. 68, pp. 207-229 (1981).
Cox, R. J., Mol. Cryst. Liq. Cryst., vol. 55, pp. 1-32 (1979).

Primary Examiner—Teddy S. Gron
Attorney, Agent, or Firm—Sughrue, Mion, Zinn, Macpeak & Seas

[57] ABSTRACT

A liquid crystal composition containing azo dyes represented by the formula ($I_0$)

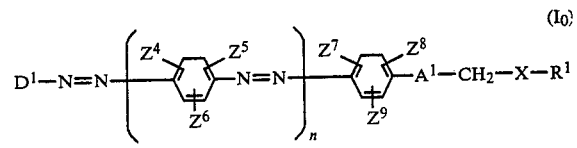

wherein
X represents

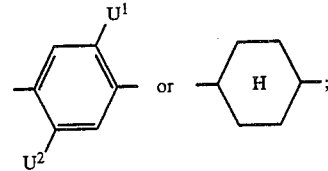

$A^1$ represents —O— or —NH—,
$R^1$ represents a hydrogen atom, an alkyl group, an alkoxyalkyl group, an aryloxyalkyl group, a dialkylaminoalkyl group, an arylaminoalkyl group, a cycloalkyl group, an alkoxy group, an alkoxyalkoxy group, an arylalkoxy group, an aryl group, a halogen atom or a group of (Abstract continued on next page.)

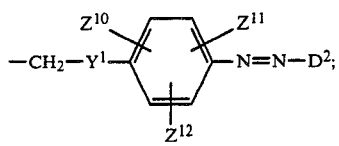

$D^1$ and $D^2$ each represents an aromatic group which does not contain an ionic group; $U^1$ and $U^2$ each represents a hydrogen atom, a halogen atom, a methyl group, a methoxy group or an ethoxy group;

$Y^1$ represents —O— or

R represents a hydrogen atom, an alkyl group or may be connected to $Z^{10}$ to $Z^{12}$ to form a ring;

$Z^4$ to $Z^{12}$ each represents a hydrogen atom, a halogen atom, an alkyl group, an alkoxy group, a hydroxy group, an acylamino group or a cyano group, or $Z^4$ and $Z^5$, $Z^7$ and $Z^8$, and $Z^{10}$ and $Z^{11}$ may be connected to each other to form an aromatic ring; and n represents 0, 1 or 2.

5 Claims, 4 Drawing Figures

LIQUID CRYSTAL COMPOSITION

FIELD OF THE INVENTION

The present invention relates to a liquid crystal composition containing pleochroic azo dyes.

BACKGROUND OF THE INVENTION

Pleochroic dyes are dyes having the property that light absorption intensity depends on direction of the dye molecule. Namely, the absorption intensity of these dyes is maximized when the direction of absorption transition moment is parallel to the electric vector of light, and is minimized when it is perpendicular to the electric vector of light.

In the aforesaid liquid crystal display device, orientation of the dye molecules can be changed by utilizing the phenomenon that the orientation direction of liquid crystal molecules is changed by applying a voltage. Thus, it is possible to change the color of the liquid crystal display device by applying a voltage. The change of color is called "guest-host effect" taking the liquid crystal compound as host and the dye as guest.

Of the pleochroic dyes, those which have parallel dichroism show such properties that the direction of absorption transition moment of visible light is almost parallel to the longer axis of the molecule and, when dissolved as a guest molecule in a host liquid crystal, the dye molecules are aligned so that the longer axis of the dye molecule is in the same direction as the orientation direction of the axis of liquid crystal molecules.

For example, in a liquid crystal display device containing a liquid crystal composition comprising a pleochroic dye with parallel dichroism and a nematic liquid crystal compound with positive dielectric anisotropy and having been subjected to homogeneous orientation treatment, a homogeneous orientation is formed, wherein the longer axis of the dye molecules is aligned in parallel to the electrode plane similarly with the liquid crystal molecules. When white light traveling in a perpendicular direction to the electrode plane and polarized to the same direction as the orientation direction of the liquid crystal molecules travels through the liquid crystal layer in the above-described aligned state, the electric vector of the light becomes parallel with the dye molecules and a particular wavelength region is strongly absorbed and, as a result, the liquid crystal layer takes a strongly colored state. When a voltage is applied to the above-described liquid crystal layer, the longer axis of the dye molecule causes homeotropic orientation due to the positive dielectric anisotropy of the host liquid crystal. Thus, the longer axis of the dye molecules becomes perpendicular to the electric vector of incident white light, and hence the incident light is scarcely absorbed by the dye molecule and, as a result, the liquid crystal layer takes a weakly colored state.

The guest-host effect can be obtained not only by utilizing nematic liquid crystal compounds as described above but by utilizing, for example, smectic liquid crystal compounds or utilizing cholesteric-nematic phase change as well. In the case of utilizing phase transition, each molecule of a cholesteric liquid crystals in a device having been subjected to homogeneous orientation treatment takes a helical arrangement. When white light travels through the liquid crystal layer in a direction perpendicular to the electrode plane, a particular wavelength region of all polarization components is strongly absorbed by the dye molecules, because the dye molecules are existent in various directions. As a result, the liquid crystal layer becomes a strongly colored state.

Then, when the host cholesteric liquid crystals have positive dielectric anisotropy, application of a voltage to the liquid crystal layer in the above-described state causes homeotropic alignment of the longer axis of the dye molecule similarly with the liquid crystal molecule due to the relaxation of the helical arrangement of the liquid crystal molecules. As a result, the liquid crystal layer becomes a weakly colored state.

The pleochroic dyes as described above are required to possess: (1) a high "order parameter" (presented as S) in a host liquid crystal; (2) a sufficient solubility in a host liquid crystal; (3) a high stability against light, heat and electricity; and (4) a hue according to the end-use. Particularly, at least (1) and (2) are required for raising contrast of a resulting display device.

The order parameter S is defined by the equation (I) and is experimentally determined by the equation (II):

$$S (3 \overline{\cos^2 \theta} - 1)/2 \tag{I}$$

$$S (A// - A\perp)/(2A\perp + A//) \tag{II}$$

wherein the term of $\cos^2\theta$ is timewise averaged, $\theta$ represents an angle between the absorption axis of the dye molecule and the orientation direction of the liquid crystal molecule, and $A\|$ and $A\perp$ represent the absorbances of the dye molecules for the light polarized parallel to and perpendicular to the orientation direction of the liquid crystal molecules, respectively.

With pleochroic dyes having parallel dichroism, the nearer the S value to 1 which is the theoretical maximum, the less the degree of residual color in a weakly colored state, which serves to realize high brightness, high contrast display.

An object of the present invention is to provide novel pleochroic dyes having parallel dichroism and capable of satisfying the aforesaid requirements (1), (2) and (3), a liquid crystal composition which can produce high contrast, high brightness display, and a display device containing the composition.

Relationship between the molecular structure of pleochroic dye and the various properties has not fully been clarified yet, and hence it is quite difficult to select the pleochroic dye which has a desired hue and satisfies all requirements described hereinbefore based on knowledges about known materials.

SUMMARY OF THE INVENTION

As a result of intensive investigations, the present inventors have found that the above-described object can be attained and, particularly, order parameter and solubility can be improved by introducing a saturated or unsaturated ring, namely, a benzene ring or cyclohexane ring into azo dye skeleton via $-OCH_2-$ or $-NH-CH_2-$.

Further, it has been confirmed that the bond $-OCH_2-$ which links the azo dye skeleton to the benzene ring or cyclohexane ring has an important meaning and the above-described object cannot be sufficiently attained in the viewpoint of order parameter, etc., in case of linkage with the bond $-O(CH_2)_m-$ wherein $m \geq 2$.

Accordingly, an object of the present invention is to provide a liquid crystal composition containing azo dyes represented by the formula ($I_0$)

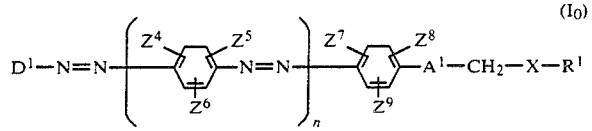

wherein X represents

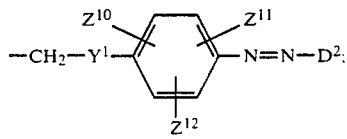

$A^1$ represents —O— or —NH—;

$R^1$ represents a hydrogen atom, an alkyl group, an alkoxyalkyl group, an aryloxyalkyl group, a dialkylaminoalkyl group, an arylaminoalkyl group, a cycloalkyl group, an alkoxy group, an alkoxyalkoxy group, an arylalkoxy group, an aryl group, a halogen atom or a group of

$D^1$ and $D^2$ each represents an aromatic group which does not contain an ionic group;

$U^1$ and $U^2$ each represents a hydrogen atom, a halogen atom, a methyl group, a methoxy group or an ethoxy group;

$Y^1$ represents —O— or

R represents a hydrogen atom, an alkyl group or may be connected to $Z^{10}$ to $Z^{12}$ to form a ring;

$Z^4$ to $Z^{12}$ each represents a hydrogen atom, a halogen atom, an alkyl group, an alkoxy group, a hydroxy group, an acylamino group or a cyano group, or $Z^4$ and $Z^5$, $Z^7$ and $Z^8$, and $Z^{10}$ and $Z^{11}$ may be connected to each other to form an aromatic ring; and n represents 0, 1 or 2.

DETAILED DESCRIPTION OF THE INVENTION

Figure 1:
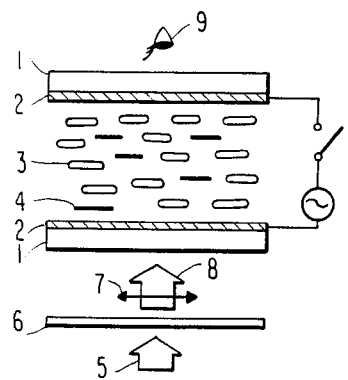
FIG. 1 and FIG. 3 show schematic cross sections of display devices in accordance with the present invention in a state of applying no voltage.

The present invention is described in detail. The pleochroic azo dyes represented by the foregoing formula ($I_0$) are novel dyes having excellent order parameter and solubility in a liquid crystal material and having good solubility.

The specific examples of the pleochroic azo dyes are the azo dyes represented by the formula (I-1)

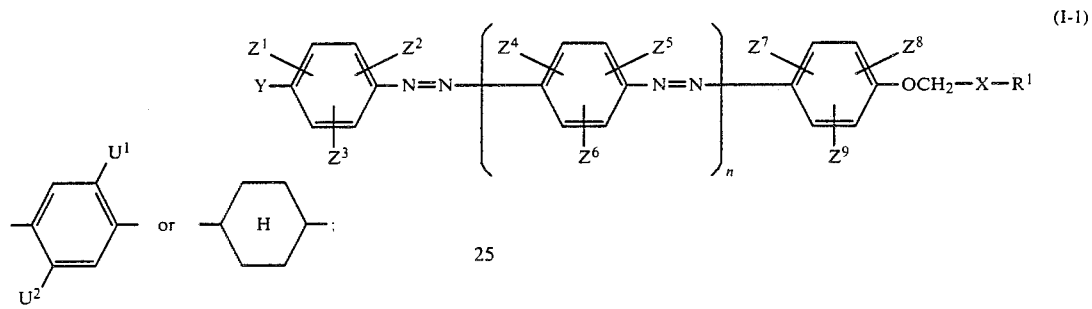

wherein $R^1$ represents an alkyl group, an alkoxyalkyl group, an aryloxyalkyl group, an alkoxy group or an arylalkoxy group;

X represents

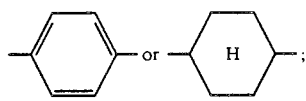

Y represents a hydrogen atom, an alkyl group, a cycloalkyl group, an alkoxy group, a nitro group, a cyano group, a carboxylic acid ester group, an acyloxy group, an aryl group, an alkylsulfonyl group, a halogen atom or $$-N\begin{matrix}R^2\\R^3\end{matrix}$$

$R^2$ and $R^3$ each represents a hydrogen atom, an alkyl group, or $R^2$ and $R^3$ may be connected to each other to form a nitrogen containing ring;

$Z^1$ to $Z^9$ each represents a hydrogen atom, a halogen atom, a methyl group, a hydroxy group, a methoxy group, a cyano group, or $Z^1$, $Z^2$ or $Z^3$ may be connected to $R^2$ or $R^3$ to form a nitrogen containing ring, or $Z^1$ and $Z^2$, $Z^4$ and $Z^5$, or $Z^7$ and $Z^8$ may be connected to each other to form an aromatic ring; and n represents 0, 1 or 2; and the azo dyes represented by the formula (I-2)

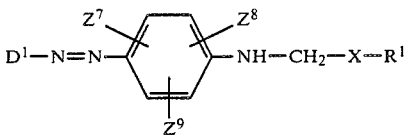

wherein X represents

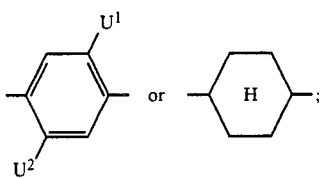

$R^1$ represents a hydrogen atom, an alkyl group, an alkoxy group, an aryloxyalkoxy group, a dialkylaminoalkyl group, an arylaminoalkyl group, a cycloalkyl group, an alkoxy group, an alkoxyalkoxy group, an aryl group, a halogen atom or a group of

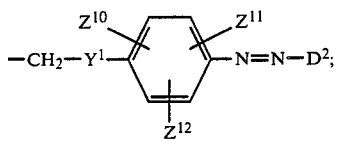

$D^1$ and $D^2$ each represents an aromatic group which does not contain an ionic group;

$U^1$ and $U^2$ each represents a hydrogen atom, a halogen atom, a methyl group, a methoxy group or an ethoxy group;

$Y^1$ represents —O— or

R represents a hydrogen atom or an alkyl group, or may be connected to $Z^{10}$ to $Z^{12}$ to form a ring; and $Z^7$ to $Z^{12}$ each represents a hydrogen atom, a halogen atom, an alkyl group, an alkoxy group, an acylamino group or a cyano group, and $Z^7$ and $Z^8$, and $Z^{10}$ and $Z^{11}$ may be connected to each other to form an aromatic ring.

Examples of $R^1$ in the formula (I-1) include an alkyl group such as a methyl group, an ethyl group, a straight or branched chain propyl group, a butyl group, a hexyl group, an octyl group, a dodecyl group or an octadecyl group, etc.; an alkoxyalkyl group such as an ethoxymethyl group, a butoxymethyl group, a hexyloxymethyl group or an octyloxymethyl group, etc.; an aryloxyalkyl group such as a p-n-butylphenoxymethyl group, a p-n-butoxyphenoxymethyl group, a phenoxymethyl group substituted by an azo group, a naphthoxymethyl group substituted by an azo group or a quinolinoxymethyl group substituted by an azo group, etc.; an alkoxy group such as a methoxy group, an ethoxy group, a straight or branched chain propoxy group, a butoxy group, a hexyloxy group, a heptyloxy group, a decyloxy group or an octadecyloxy group, etc.; and an arylalkoxy group such as a p-n-butylbenzyloxy group or a p-n-butoxybenzyloxy group, etc.

Examples of Y in the formula (I-1) include a hydrogen atom, an alkyl group such as a methyl group, an ethyl group, a straight or branched chain propyl group, a butyl group, a heptyl group, an octyl group, a dodecyl group or an octadecyl group, etc.; a cycloalkyl group such as a cyclohexyl group, a propylcyclohexyl group, a butylcyclohexyl group or a heptylcyclohexyl group, etc.; an alkoxy group such as a methoxy group, a propoxy group, a pentyloxy group, an octyloxy group or an octadecyloxy group, etc.; a nitro group; a cyano group; a carboxylic acid ester group such as a methoxycarbonyl group, a butoxycarbonyl group, an octyloxycarbonyl group, a propylcyclohexyloxycarbonyl group, a heptylcyclohexyloxycarbonyl group, a butylphenoxycarbonyl group, a butoxyphenoxycarbonyl group or a pentylcyclohexylphenoxycarbonyl group, etc.; an acyloxy group such as an acetoxy group, a pentanoyloxy group, an octanoyloxy group, a butylbenzoyloxy group, a butoxybenzoyloxy group or a pentylcyclohexylcarbonyloxy group, etc.; an alkylsulfonyl group such as an ethylsulfonyl group, a butylsulfonyl group or an octylsulfonyl group, etc.; an aryl group such as a phenyl group, a butylphenyl group, an octylphenyl group, a butoxyphenyl group or a heptyloxyphenyl group, etc.; a halogen atom such as a fluorine atom, a chlorine atom or a bromine atom, etc., and

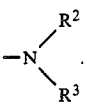

When Y represents

$R_2$ and $R^3$ each represents a hydrogen atom or an alkyl group such as a methyl group, an ethyl group, a propyl group, a butyl group, a hexyl group or an octyl group, etc. Further,

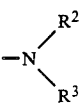

may be connected to each other to form a nitrogen containing ring such as a morpholino group or a piperazino group, etc.

Examples of $Z^1$ to $Z^9$ include a hydrogen atom, a halogen atom such as a fluorine atom, a chlorine atom or a bromine atom, a methyl group, a hydroxy group, a methoxy group, a cyano group, or $Z^1$, $Z^2$ or $Z^3$ may be connected to $R^2$ or $R^3$ to form a nitrogen containing ring as in the case where

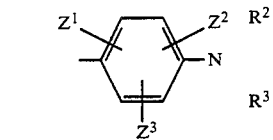

represents

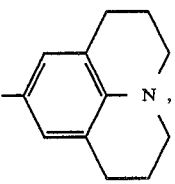

or $Z^1$ and $Z^2$, $Z^4$ and $Z^5$ or $Z^7$ and $Z^8$ may be connected to each other to form a part of a benzene ring such as a benzene ring or a pyridine ring, etc.

The pleochroic azo dyes represented by the above-described formula (I-1) are prepared by, for example, reacting a compound represented by the formula (II)

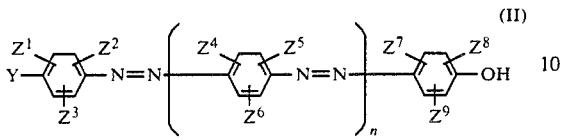

(wherein Y, $Z^1$ to $Z^9$ and n are the same as defined in the above-described formula (I-1)) with a compound represented by the formula (III)

$$X-CH_2-X-R^1 \qquad (III)$$

(wherein X and $R^1$ are the same as defined in the above-described formula (I-1)) in a known manner.

The specific example of $D^1$ in the formula (I-2) is a group represented by the formula

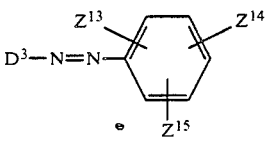

wherein $D^3$ is an aromatic group which does not contain an ionic group; and $Z^{13}$ to $Z^{15}$ each represents a hydrogen atom, a halogen atom, an alkyl group, an alkoxy group, an acylamino group or a cyano group or $Z^{13}$ and $Z^{15}$ may be connected to each other to form an aromatic ring; or a group represented by the formula

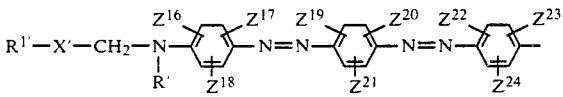

wherein X' represents

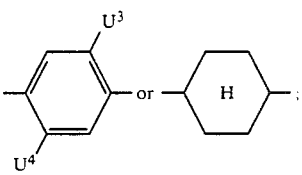

$Z^{16}$ to $Z^{24}$ each represents a hydrogen atom, a halogen atom, an alkyl group, an alkoxy group, an acylamino group or a cyano group, or $Z^{16}$ and $Z^{17}$, $Z^{19}$ and $Z^{20}$, and $Z^{22}$ and $Z^{23}$ may be connected to each other to form an aromatic ring;

R' represents a hydrogen atom or an alkyl group, or may be connected to $R^{16}$ to $R^{18}$ to form a nitrogen-containing group;

$U^3$ and $U_4$ each represents a hydrogen atom, a halogen atom, a methyl group, a methoxy group or an ethoxy group; and $R^{1'}$ represents a hydrogen atom, an alkyl group, an alkoxyalkyl group, an aryloxyalkyl group, an alkylaminoalkyl group, a dialkylaminoalkyl group, an arylaminoalkyl group, a cycloalkyl group, an alkoxy group, an alkoxyalkoxy group, an aryl group or a halogen atom.

Representative examples of the aromatic group which does not contain the ionic group of $D^1$ to $D^3$ in the formula (I-2) include benzene-type, naphthalene-type or heterocyclic aromatic groups.

Examples of the heterocyclic aromatic groups include nitrogen- or sulfur-containing heterocyclic rings such as thiazole, isothiazole, imidazole, thiadiazole or thiophene.

The aromatic groups may be substituted with nonionic groups.

Preferred examples of the nonionic groups include an alkyl or cycloalkyl group which may be substituted with an alkoxy group, a cycloalkyl group, an aryl group or an arylxoy group; an aryl group which may be substituted with an alkyl group, an alkoxy group, a cycloalkyl group, an aryl group, a cyano group, a carboxylic acid ester group, a halogen atom or an acyloxy group, an arylazo group; a heterocyclic azo group; a halogen atom; a carboxylic acid ester group; an acyloxy group; a trifluoromethyl group; a nitro group; an alkylsulfonyl group; a sulfonic acid ester group; an amino group; an acylamino group; a cyclic amino group such as a pyrrolidino group, a morpholino group, a piperidino group or a piperadino group; an alkylamino or dialkylamino group which may be substituted with an alkoxy group, an aryl group or a cycloalkyl group; or a heterocyclic ring group such as a pyridine ring, a pyrimidine ring, a thiazole ring, an oxazole ring, an oxadiazole ring, a thiadiazole ring, a thiophene ring, a furan ring or a dioxane ring.

Representative examples of $Z^7$ to $Z^{24}$ include a hydrogen atom; an alkyl group such as a methyl group or an ethyl group; an alkoxy group such as a methoxy group or an ethoxy group; an acylamino group such as an acetylamino group; a halogen atom such as a fluorine atom, a chlorine atom or a bromine atom; a cyano group.

Representative examples of $R^1$ and $R^{1'}$ include a hydrogen atom; a halogen atom such as a fluorone atom, a chlorine atom or a bromine atom; a straight chain or branched chain alkyl or alkoxy group containing 1 to 18 carbon atoms; a cycloalkyl or aryl group which may be substituted with a straight chain or branched chain alkyl or alkoxy group; an alkoxyalkyl, alkoxyalkoxy or dialkylaminoalkyl group containing up to 20 carbon atoms; an aryloxyalkyl or arylaminoalkyl group which may be substituted with nonionic substituents such as an alkyl group, an alkoxy group, a cycloalkyl group, an aryl group or an aromatic azo group; and the like. Additional example of $R^1$ includes the group represented by the formula (II) described below and additional example of $R^{1'}$ includes an alkylaminoalkyl group containing up to 20 carbon atoms.

Of the above examples, $R^1$ which contains an azo group and is represented by the formula (II')

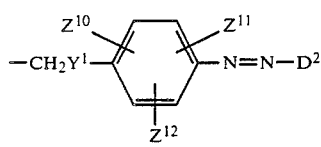

wherein $Y^1$ is an oxygen atom or

wherein R is a hydrogen atom or an alkyl group, preferably an alkyl group containing 1 to 4 carbon atoms, is preferred.

The present invention can have not only —NHCH$_2$— bond at the terminal of the azo dye skeleton but also a plurality of —NHCH$_2$— bonds inside and/or at the terminals of a plurality of the azo dye skeletons.

The examples of the azo dye skeleton which is a structural component of the dye according to the present invention include not only monoazo skeletons but also polyazo skeletons such as trisazo, tetrakisazo or pentakisazo. The dye skeleton can contain a heterocyclic ring containing a nitrogen atom, a sulfur atom or an oxygen atom. The azo dye skeleton can also contain nonionic substituents. Of the nonionic substituents, as the substituents positioned at the both terminals in the direction of the longer axis of the dye molecule, it is preferred that the total carbon atom number in the alkyl chains present in the two substituents is at least 3.

The dye represented by the formula (I-2) can be prepared by reacting an amino compound represented by the formula $D^1$—NH$_2$ wherein $D^1$ is the same as defined in the formula (I-2), with a compound represented by the formula

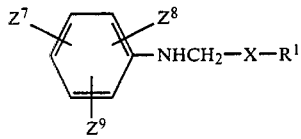

wherein $Z^7$ to $Z^9$, X and $R^1$ are the same as defined in the formula (I-2), in the conventional manners such as disazotization or coupling.

Other conventional production process comprising reacting a compound represented by the formula

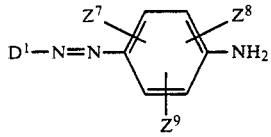

wherein $D^1$ and $Z^7$ to $Z^9$ are the same as defined in the formula (I-2), with a compound represented by the formula

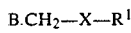

wherein B represents a halogen atom or a sulfonyloxy group, and X and $R^1$ are the same as defined in the formula (I-2), or comprising reducing two molecules of nitro compound to prepare an azo compound can be utilized to prepare the dye of the present invention.

Nematic liquid crystals to be used in the present invention can be selected from a considerably wide range of liquid crystals as long as they show a nematic state in an operating temperature range.

Further, such nematic liquid crystals can take a cholesteric state when an optically active substance is added thereto. Examples of nematic liquid crystals include substances given in Table 1 and derivatives thereof.

TABLE 1

| No. | Type | Example |
|-----|------|---------|
| 1 | Cyclohexylcyclohexane type | R'—(H)—(H)—X |
| 2 | Phenylcyclohexane type | R'—(H)—⬡—X |
| 3 | Biphenyl type | R'—⬡—⬡—X |
| 4 | Terphenyl type | R'—⬡—⬡—⬡—X |
| 5 | Cyclohexylcyclohexanoate type | R'—(H)—COO—(H)—X |
| 6 | Phenyl cyclohexylcarboxylate type | R'—(H)—COO—⬡—X |
| 7 | Ester type | R'—⬡—COO—⬡—X |
| 8 | Diester type | R'—⬡—COO—⬡—COO—⬡—X<br>X—⬡—COO—⬡—COO—⬡—R' |
| 9 | Biphenyl cyclohexylcarboxylate type | R'—(H)—COO—⬡—⬡—X |
| 10 | Biphenyl ester type | R'—⬡—⬡—COO—⬡—X<br>X—⬡—⬡—COO—⬡—R' |
| 11 | Thioester type | R'—⬡—COS—⬡—X |
| 12 | Schiff type | R'—⬡—CH=N—⬡—X<br>X—⬡—CH=N—⬡—R' |
| 13 | Pyrimidine type | R'—⬡—(N-pyrimidine)—X<br>R'—(N-pyrimidine)—⬡—X<br>R'—⬡—(N-pyrimidine)—X |

TABLE 1-continued

| No. | Type | Example |
|---|---|---|
| 14 | Dioxane type | R'—[pyrimidine]—[phenyl]—X |
| | | R'—[dioxane]—[phenyl]—X |
| 15 | Cyclohexyl-methyl ether type | R'—(H)—CH$_2$O—[phenyl]—X |
| | | R'—(H)—CH$_2$O—[phenyl]—[phenyl]—X |
| 16 | Cinnamo-nitrile type | R'—(H)—[phenyl]—CH=CH—X |

In the above-described formulae, R' represents an alkyl group or an alkoxy group, and X represents a nitro group, a cyano group or a halogen atom.

Liquid crystals given in Table 1 all show a positive dielectric anisotropy. However, known ester type, azoxy type, azo type, Schiff type, pyrimidine type, diester type or biphenyl ester type liquid crystals showing a negative dielectric anisotropy can also be used by mixing with a liquid crystal showing a positive dielectric anisotropy so that the resulting mixed liquid crystal shows in the whole a positive dielectric anisotropy. Further, liquid crystals showing a negative dielectric anisotropy can be used as such, of course, by employing a proper element device constitution and a proper driving method.

As the host liquid crystal substance to be used in the present invention, any of the liquid crystal compounds shown in Table 1 and the mixture thereof may be used. A liquid crystal substance sold by Merck & Co. under the trade name of ZLI-1132 which is a mixture of the following four liquid crystal compounds:

| | |
|---|---|
| C$_3$H$_7$—(H)—[phenyl]—CN | 38.4% by weight |
| C$_5$H$_{11}$—(H)—[phenyl]—CN | 34.2% by weight |
| C$_7$H$_{15}$—(H)—[phenyl]—CN | 18.1% by weight |
| C$_5$H$_{11}$—(H)—[phenyl]—[phenyl]—CN | 9.3% by weight | and a liquid crystal substance sold by British Drug House Co. under the trade name of E-7 which is a mixture of the following four liquid crystal compounds:

| | |
|---|---|
| C$_5$H$_{11}$—[phenyl]—[phenyl]—CN | 51% by weight |
| C$_7$H$_{15}$—[phenyl]—[phenyl]—CN | 25% by weight |
| C$_8$H$_{17}$O—[phenyl]—[phenyl]—CN | 16% by weight |
| C$_5$H$_{11}$—[phenyl]—[phenyl]—[phenyl]—CN | 8% by weight | have been found to be particularly useful in the present invention.

As the optically active substance to be added to the liquid crystal composition of the present invention, there are chiral nematic compounds such as compounds prepared by introducing an optically active group, for example, a 2-methylbutyl group, a methylbutoxy group, a methylpentyl group, a 3-methylpentoxy group, a 4-methylhexyl group or a 4-methylhexyloxy group, etc., to a nematic liquid crystal compound. In addition, optically active substances such as alcohol derivatives such as l-mentol, d-borneol, etc., shown in Japanese Patent Laid-Open No. 45546/76, ketone derivatives such as d-camphor, 3-methylcyclohexanone, etc., carboxylic acid derivatives such as d-citronellic acid or l-camphoric acid, etc., aldehyde derivatives such as d-citronellal, etc., alkene derivatives such as d-limonene, etc., amines, amides and nitriles, etc., can, of course, be used.

As the element device, known element devices for liquid crystal display can be used in the present invention. That is, in general, there are used those element devices which are constituted by two glass plates at least one of which is transparent, which are in parallel with each other and spaced from each other via a proper spacer, and on which a transparent plane electrode of arbitrary pattern is provided so as to face each other. In this case, the spacer decides the gap in the element device. From the practical point of view, the element gap is preferably 3 to 100 μm, most preferably 5 to 50 μm.

In the following, the pleochroic dyes having parallel dichroism to be used in the liquid crystal composition of the present invention and the liquid crystal composition containing the dye are described in detail by reference to examples.

EXAMPLE 1

Examples of pleochroic dyes used in the liquid crystal composition of the present invention are shown in Table 2 together with the hue thereof and the order parameter (S).

TABLE 2

| No. | Structural Formula | S/Hue |
|---|---|---|
| 1 | [phenyl]—N=N—[phenyl]—N=N—[phenyl]—OCH$_2$—[phenyl]—OC$_7$H$_{15}$(n) | 0.73/Yellow |

TABLE 2-continued

| No. | Structural Formula | S/Hue |
|---|---|---|
| 2 | (n)H₉C₄ structure: Ph—N=N—C₆H₄—N=N—C₆H₃(CH₃)—OCH₂—C₆H₄—OC₄H₉(n) | 0.70/Yellow |
| 3 | H₃CO—C₆H₄—N=N—C₆H₃(CH₃)—N=N—C₆H₄—OCH₂—C₆H₄—OC₄H₉(n) | 0.69/Yellow |
| 4 | (n)H₉C₄—C₆H₄—N=N—C₆H₄—N=N—C₆H₃(CH₃)—OCH₂—C₆H₄—OC₄H₉(n) | 0.71/Yellow |
| 5 | (n)H₉C₄—C₆H₄—N=N—C₆H₃(CH₃)—N=N—C₆H₄—OCH₂—C₆H₄—CH₂OC₈H₁₇(n) | 0.70/Yellow |
| 6 | (n)H₉C₄—C₆H₄—N=N—C₆H₃(CH₃)—N=N—C₆H₄—OCH₂—C₆H₄—C₄H₉(n) | 0.71/Yellow |
| 7 | (n)H₉C₄O₂S—C₆H₄—N=N—C₆H₂(OCH₃)₂—N=N—C₆H₄—OCH₂—C₆H₄—Cl | 0.65/Yellow |
| 8 | (n)H₇C₃—C₆H₄—C₆H₄—N=N—C₆H₄—N=N—C₆H₄—OCH₂—C₆H₄—OC₄H₉(n) | 0.76/Yellow |
| 9 | O₂N—C₆H₄—N=N—(naphthyl)—N=N—C₆H₄—OCH₂—C₆H₄—OC₄H₉(n) | 0.74/Yellow |
| 10 | NC—C₆H₄—N=N—(naphthyl)—N=N—C₆H₄—OCH₂—(cyclohexyl-H)—C₄H₉(n) | 0.74/Yellow |
| 11 | (n)H₇C₃OOC—C₆H₄—N=N—(naphthyl)—N=N—C₆H₄—OCH₂—(cyclohexyl-H)—C₄H₉(n) | 0.74/Yellow |
| 12 | (n)H₉C₄—C₆H₄—OOC—C₆H₄—N=N—(naphthyl)—N=N—C₆H₄—OCH₂—C₆H₄—OC₄H₉(n) | 0.75/Yellow |
| 13 | H₇C₃—(cyclohexyl-H)—C₆H₄—N=N—(naphthyl)—N=N—C₆H₄—OCH₂—C₆H₄—OC₇H₁₅(n) | 0.76/Yellow |
| 14 | (H₅C₂)₂N—C₆H₄—N=N—(naphthyl)—N=N—C₆H₄—OCH₂—C₆H₄—CH₂OC₆H₁₃(n) | 0.76/Bluish red |
| 15 | (n)H₉C₄—C₆H₄—N=N—(naphthyl)—N=N—C₆H₃(OH)—OCH₂—C₆H₄—OC₄H₉(n) | 0.69/Yellow |

TABLE 2-continued

| No. | Structural Formula | S/Hue |
|---|---|---|
| 16 | (n)H₁₇C₈COO—⟨⟩—N=N—⟨naphthalene⟩—N=N—⟨⟩(CH₃)—OCH₂—⟨⟩—OC₄H₉(n) | 0.67/Yellow |
| 17 | (H₃C)₂N—⟨⟩—N=N—⟨⟩—N=N—⟨⟩—OCH₂—⟨⟩—OC₄H₉ | 0.75/Orange |
| 18 | (n)H₉C₄—⟨⟩—N=N—⟨⟩—N=N—⟨quinoline with OCH₂—⟨⟩—OC₇H₁₅(n)⟩ | 0.75/Yellow |
| 19 | (n)H₉C₄—⟨⟩—N=N—⟨⟩(CH₃)—N=N—⟨⟩—OCH₂—⟨H⟩—C₄H₉(n) | 0.68/Yellow |
| 20 | F—⟨⟩—N=N—⟨⟩—N=N—⟨⟩(OH)—OCH₂—⟨⟩—OC₆H₁₃(n) | 0.69/Yellow |
| 21 | (n)H₉C₄—⟨⟩—N=N—⟨naphthalene⟩—N=N—⟨⟩—OCH₂—⟨⟩—OC₇H₁₅(n) | 0.75/Yellow |
| 22 | (n)H₉C₄—⟨⟩—N=N—⟨⟩(Cl,CH₃)—N=N—⟨⟩—OCH₂—⟨⟩—OC₄H₉(n) | 0.66/Yellow |
| 23 | H₇C₃—⟨⟩—⟨⟩—N=N—⟨naphthalene⟩—N=N—⟨⟩—OCH₂—⟨⟩—OC₄H₉(n) | 0.77/Yellow |
| 24 | (n)H₁₇C₈OOC—⟨⟩—N=N—⟨⟩—N=N—⟨⟩—OCH₂—⟨⟩—OC₄H₉(n) | 0.75/Yellow |
| 25 | (n)H₉C₄—⟨⟩—N=N—⟨naphthalene⟩—N=N—⟨⟩—OCH₂—⟨⟩—CH₂O—⟨⟩—C₄H₉(n) | 0.75/Yellow |
| 26 | (H₃C)₂N—⟨⟩(CH₃)—N=N—⟨naphthalene⟩—N=N—⟨⟩—OCH₂—⟨H⟩—C₄H₉(n) | 0.74/Bluish red |
| 27 | (H₅C₂)₂N—⟨⟩(OH)—N=N—⟨naphthalene⟩—N=N—⟨⟩—OCH₂—⟨⟩—C₄H₉(n) | 0.73/Bluish red |

TABLE 2-continued

| No. | Structural Formula | S/Hue |
|-----|-------------------|-------|
| 28 | | 0.74/Bluish red |
| 29 | | 0.76/Bluish red |
| 30 | | 0.70/Bluish red |
| 31 | | 0.74/Red |
| 32 | | 0.77/Bluish red |
| 33 | | 0.78/Yellow |
| 34 | | 0.74/Yellow |
| 35 | | 0.79/Yellow |
| 36 | | 0.80/Bluish red |

The characteristic properties of each dye shown in Table 2 were determined as follows. That is, one of the dyes shown in Table 2 was added as a pleochroic dye to the foregoing phenylcyclohexane type mixed liquid crystal ZLI-1132, heated to 70° C. or higher, well stirred when the mixed liquid crystal became isotropic liquid, then allowed to cool. These procedures were repeated to dissolve the dye.

The thus-prepared liquid crystal composition was sealed in an element device composed of upper and lower two glass plates with a plate-to-plate gap of 10 to 100 μm, with the surface of the plate to be in contact with the liquid crystal having been coated with a polyamide resin and, after hardening the resin, having been subjected to rubbing treatment to conduct homogeneous orientation treatment. In the above-described element device having been subjected to the orientation treatment, the above-described liquid crystal composition took, when no electric field was applied thereto, a homogeneously oriented state as shown in FIG. 1, and the dye molecules were similarly oriented following the host liquid crystal.

The structure of liquid crystal display device shown in FIG. 1 is that which is common to ordinary devices except for containing the liquid crystal composition of the present example. That is, the element device comprises upper and lower transparent glass plates 1, transparent electrodes 2 formed inside each plate, and the liquid crystal composition of the present example sandwiched between the two glass plates and comprising liquid crystal molecules 3 and pleochroic dye molecules 4.

Incident natural light is polarized, when passing through a polarizing sheet 6, to a polarizing direction 7, and reaches the device as incident polarized light 8. Additionally, 9 indicates a viewer.

Absorption spectrum of the liquid crystal composition of the present example was measured using the light polarized parallel and perpendicular to the direction of orientation of the liquid crystal molecules to obtain absorbances A∥ and A⊥ of the dye for the polarized lights and maximum absorption wavelength. In obtaining absorbance of the dye, corrections were made for the absorption of host liquid crystal and of glass plates and for reflection loss of the element device.

Order parameter S was obtained according to the foregoing equation (II) using the thus-determined absorbances A∥ and A⊥ of the dye for the polarized lights.

EXAMPLE 2

A liquid crystal composition prepared by adding dye No. 21 in Table 2 to the same liquid crystal as used in Example 1 in a content of 0.91% by weight was sealed in the same element device as used in Example 1, and absorption spectrum was measured in the same manner as in Example 1. The plate-to-plate gap was about 10 μm.

Figure 2:
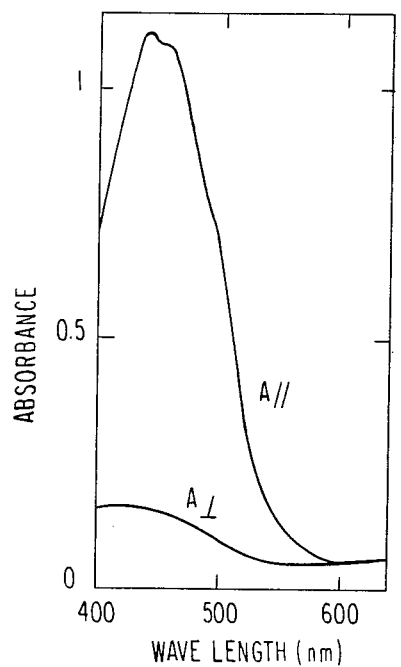
FIG. 2 shows an absorption spectrum of the display device in accordance with the present invention.
Figure 3:
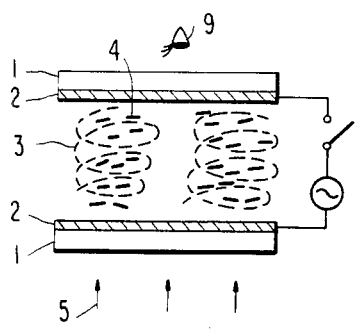
Figure 4:
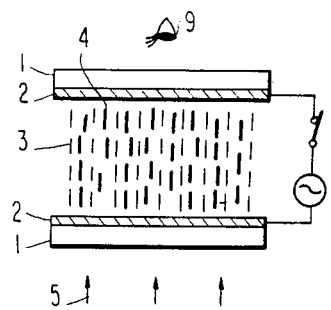
FIG. 4 shows a schematic cross section of the display device in accordance with the present invention in a state of applying a voltage.

The absorption spectrum of the liquid crystal composition of this Example is shown in FIG. 2, wherein curve i shows A∥ and curve ii shows A⊥. Maximum absorption in visible region was 440 nm, and value S of the dye of the present example at the maximum absorption wavelength was 0.75.

EXAMPLE 3

0.75 g of sodium nitrite was added to a mixture of 1.55 g of p-aminoethylbenzoate, 3 ml of concentrated hydrochloric acid and 20 ml of water at 0° to 5° C., and the resulting mixture was stirred for 3 hours at the same temperature. Sulfamic acid was added thereto to consume excess of sodium nitrite thereby to prepare a diazo solution.

The diazo solution was added to a mixture of 2.96 g of a compound of the formula

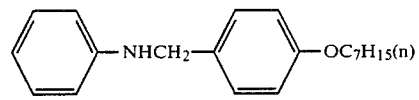

which was prepared by conventional manner, and 20 ml of tetrahydrofuran, and reaction was conducted at temperature of 10° C. or less for 5 hours. 50 ml of water was added to the reaction mixture. The precipitates thus-formed were recovered by filtration and then purified by column chromatography to obtain dye No. 42 represented by the formula

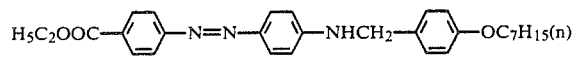

shown in Table 3 below. The melting point of this dye was 139° to 139.5° C. and the maximum absorption wavelength thereof in the phenylcyclohexane type mixed liquid crystal ZLI-1132 was 430 nm.

EXAMPLE 4

0.75 g of sodium nitrate was added to a mixture of 1.05 g of the compound represented by the formula

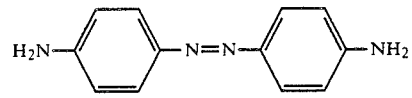

3 ml of concentrated hydrochloric acid and 25 ml of water at a temperature of 0° to 5° C., and the resulting mixture was stirred at the same temperature for 4 hours. Sulfamic acid was added thereto to consume excess of sodium nitrite thereby to obtain a diazo solution.

The resulting diazo solution was added to a mixture of 2.96 g of the compound represented by the formula

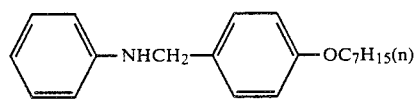

and 30 ml of N-methylpyrrolidone, and reaction was conducted at a temperature of 10° C. or less for 6 hours. Water was added to the solution and the resulting precipitates were recovered by filtration and then purified by column chromatography to obtain dye No. 128 represented by the formula

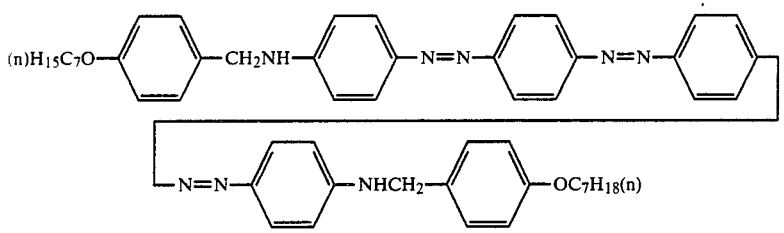
shown in Table 3 below. The melting point of this dye was 232° to 233° C. and the maximum absorption wavelength thereof was 516 nm.
According to Examples 3 and 4, the dyes shown in Table 3 below were prepared.

TABLE 3

| No. | Structural Formula | S/Hue |
|---|---|---|
| 37 | [phenyl]–N=N–[C6H4]–NHCH2–[C6H4]–C3H7(n) | 0.70/Yellow |
| 38 | (n)H9C4O–[C6H4]–N=N–[C6H4]–NHCH2–[cyclohexyl-H] | 0.70/Yellow |
| 39 | NC–[C6H4]–N=N–[C6H4]–NHCH2–[C6H4]–C4H9(n) | 0.73/Yellow |
| 40 | H5C2OOC–[C6H4]–N=N–[C6H4]–NHCH2–[cyclohexyl-H]–C3H7(n) | 0.75/Yellow |
| 41 | NC–[C6H4]–N=N–[C6H4]–NHCH2–[cyclohexyl-H]–C4H9(n) | 0.73/Yellow |
| 42 | H5C2OOC–[C6H4]–N=N–[C6H4]–NHCH2–[C6H4]–OC7H15(n) | 0.76/Yellow (λmax 430 nm) m.p. 139–139.5° C. |
| 43 | Br–[C6H4]–N=N–[C6H3(OH)]–NHCH2–[C6H4]–OC4H9(n) | 0.68/Orange |
| 44 | O2N–[C6H4]–N=N–[C6H4]–NHCH2–[C6H4]–OC7H15(n) | 0.71/Orange (λmax 470 nm) m.p. 128.5–129° C. |
| 45 | Cl–[C6H4]–N=N–[C6H3(OCH3)(CH3)]–NHCH2–[C6H4]–OC9H19(n) | 0.68/Yellow |
| 46 | (n)H9C4O–[C6H4]–N=N–[naphthyl]–NHCH2–[C6H4]–C8H17(n) | 0.69/Yellow |
| 47 | O2N–[C6H4]–N=N–[C6H3(quinoline)]–NHCH2–[C6H4]–OC7H15(n) | 0.67/Pink (λmax 517 nm) m.p. 117–118° C. |

TABLE 3-continued

| No. | Structural Formula | S/Hue |
|---|---|---|
| 48 | (n)H₇C₃O—⟨⟩—N=N—⟨⟩—NHCH₂—⟨⟩—OC₄H₉(n) | 0.75/Yellow |
| 49 | (n)H₉C₄O—⟨⟩—N=N—⟨⟩(Cl, NHCH₂—⟨⟩—Cl, N-pyridyl) | 0.70/Yellow (λmax 446 nm) m.p. 126–126.5° C. |
| 50 | NC—⟨⟩—N=N—⟨⟩—NHCH₂—⟨⟩—C₅H₁₁(n) | 0.74/Yellow |
| 51 | NC—⟨⟩—N=N—⟨⟩—NHCH₂—⟨H⟩—C₃H₇(n) | 0.74/Yellow |
| 52 | (n)H₉C₄O—⟨⟩—N=N—⟨⟩—CH₂NH—⟨⟩—N=N—⟨⟩—OC₄H₉(n) | 0.75/Yellow |
| 53 | (n)H₉C₄—⟨⟩—OOC—⟨⟩—N=N—⟨⟩—NHCH₂—⟨⟩—OC₄H₉(n) | 0.75/Yellow |
| 54 | (n)H₉C₄O—⟨⟩—OOC—⟨⟩—N=N—⟨⟩—NHCH₂—⟨H⟩—C₄H₉(n) | 0.75/Yellow |
| 55 | NC—⟨⟩—OOC—⟨⟩—N=N—⟨⟩—NHCH₂—⟨⟩—C₄H₉(n) | 0.75/Yellow |
| 56 | (i)H₇C₃—⟨⟩—CH₂HN—⟨⟩—N=N—⟨⟩—NHCH₂—⟨⟩—C₃H₇(i) | 0.73/Yellow |
| 57 | (n)H₁₅C₇O—⟨⟩—CH₂HN—⟨⟩—N=N—⟨⟩—NHCH₂—⟨⟩—OC₇H₁₅(n) | 0.74/Yellow |
| 58 | (n)H₉C₄—⟨⟩—OOC—⟨⟩—N=N—⟨⟩—NHCH₂—⟨⟩—OC₄H₉(n) | 0.78/Reddish orange |
| 59 | (n)H₉C₄—⟨H⟩—OOC—⟨⟩—N=N—⟨⟩—NHCH₂—⟨⟩—C₄H₉(n) | 0.77/Reddish orange |

TABLE 3-continued

| No. | Structural Formula | S/Hue |
|---|---|---|
| 60 | [structure] | 0.78/Red |
| 61 | [structure] | 0.74/Orange (λmax 489 nm) m.p. 127-127.5° C. |
| 62 | [structure] | 0.74/Orange |
| 63 | [structure] | 0.77/Bluish red (λmax 548 nm) m.p. 177-178.5° C. |
| 64 | [structure] | 0.75/Bluish red (λmax 532 nm) m.p. 128.5-129.5° C. |
| 65 | [structure] | 0.74/Orange |
| 66 | [structure] | 0.74/Orange |
| 67 | [structure] | 0.73/Purple |
| 68 | [structure] | 0.73/Purple |
| 69 | [structure] | 0.77/Red |

TABLE 3-continued

| No. | Structural Formula | S/Hue |
|---|---|---|
| 70 | F—C6H4—N=N—C6H4—NHCH2—C6H10—C4H9(n) | 0.75/Orange |
| 71 | (n)H9OC4—C6H4—N=N—C6H4—NHCH2—C6H10—C3H7(n) | 0.77/Orange |
| 72 | morpholino—C6H4—N=N—C6H4—NHCH2—C6H4—OC4H9(n) | 0.75/Reddish orange |
| 73 | C6H5—N=N—C6H4—NHCH2—C6H4—OC7H15(n) | 0.77/Orange (λmax 460 nm) m.p. 134.5–135° C. |
| 74 | NC—C6H3(OCH3)(CH3)—N=N—C6H4—NHCH2—C6H4—OC8H17(n) | 0.72/Orange red |
| 75 | O2N—C6H4—N=N—C6H4—NHCH2—C6H4—OC7H15(n) | 0.77/Red (λmax 506 nm) m.p. 176–176.5° C. |
| 76 | (n)H7C3OOC—C6H4—N=N—C6H4—NHCH2—C6H4—OC2H4OC3H7(n) | 0.77/Reddish orange |
| 77 | C6H5—N=N—C10H6—NHCH2—C6H4—CH2O—C6H4—C4H9(n) | 0.76/Red |
| 78 | (n)H9C4—C6H4—N=N—C10H6—NHCH2—C6H4—OC7H15(n) | 0.75/Red (λmax 509 nm) m.p. 118.5–119.2° C. |
| 79 | (n)H9C4—C6H4—N=N—C10H6—NHCH2—C6H4—OCH2CH(C2H5)C4H9(n) | 0.76/Red |

TABLE 3-continued

| No. | Structural Formula | S/Hue |
|---|---|---|
| 80 | (structure with NHCH₂-C₆H₄-OC₄H₉(n) and NHCOCH₃) | 0.69/Purple (λmax 546 nm) m.p. 171.8–173.0° C. |
| 81 | (n)H₁₇C₈O₂S-C₆H₄-N=N-naphthyl-N=N-C₆H₄-NHCH₂-C₆H₄-OC₃H₇(i) | 0.77/Purple |
| 82 | (H₃C)₂N-C₆H₄-N=N-naphthyl-N=N-C₆H₄-NHCH₂-C₆H₄-OC₄H₉ | 0.77/Reddish purple |
| 83 | H₉C₄-C₆H₄-N=N-naphthyl-N=N-C₆H₃(CH₃)-NHCH₂-C₆H₄-OC₇H₁₅(n) | 0.75/Purple (λmax 518 nm) m.p. 104.3–105.0° C. |
| 84 | (n)H₁₇C₈OOC-C₆H₄-N=N-naphthyl-N=N-C₆H₄-NHCH₂-C₆H₄-OC₂H₄OC₃H₇(n) | 0.77/Purple |
| 85 | C₆H₅-N=N-C₆H₄-N=N-C₆H₃(NHCOCH₃)-NHCH₂-C₆H₄-OC₄H₉(n) | 0.67/Red (λmax 509 nm) m.p. 211.0–211.5° C. |
| 86 | (n)H₇C₃-C₆H₁₀-C₆H₄-N=N-naphthyl-N=N-C₆H₄-NHCH₂-C₆H₄-OC₄H₉(n) | 0.77/Red |
| 87 | (n)H₁₁C₅-C₆H₄-C₆H₄-N=N-naphthyl-N=N-C₆H₄-NHCH₂-C₆H₁₀-C₅H₁₁(n) | 0.77/Red |

TABLE 3-continued

| No. | Structural Formula | S/Hue |
|-----|-------------------|-------|
| 88 | (structure with Br-phenyl-N=N-naphthyl-N=N-phenyl-NHCH₂-phenyl-C₅H₁₁(n)) | 0.75/Red |
| 89 | (structure with (n)H₇C₃-phenyl-CH₂O-phenyl-N=N-naphthyl-N=N-phenyl-NHCH₂-phenyl-OCH₂-phenyl-Cl) | 0.77/Red |
| 90 | (structure with (H₅C₂)₂N-phenyl-N=N-naphthyl-N=N-phenyl-NHCH₂-phenyl-C₅H₁₁(n)) | 0.77/Reddish purple |
| 91 | (structure with (n)H₁₁C₅-biphenyl-N=N-naphthyl-N=N-phenyl-NHCH₂-phenyl-Cl) | 0.77/Red |
| 92 | (structure with (n)H₇C₃COO-phenyl-N=N-naphthyl-N=N-phenyl-NHCH₂-phenyl-OC₇H₁₅(n)) | 0.76/Red |
| 93 | (structure with phenyl-N=N-naphthyl-N=N-phenyl-NHCH₂-phenyl-OC₄H₉(n)) | 0.78/Reddish purple (λmax 528 nm) m.p. 166.0–166.5° C. |
| 94 | (structure with phenyl-N=N-naphthyl-N=N-phenyl-NHCH₂-phenyl-C₃H₇(n)) | 0.78/Reddish purple |
| 95 | (structure with phenyl-N=N-(N-containing)phenyl-N=N-phenyl-NHCH₂-phenyl-OC₄H₉(n)) | 0.77/Red (λmax 514 nm) m.p. 163–164° C. |

TABLE 3-continued

| No. | Structural Formula | S/Hue |
|---|---|---|
| 96 | (structure: F—C6H4—N=N—C6H4—N=N—[benzene with NHCH2-C6H4-CH(CH3)C2H5(n)]) | 0.75/Red |
| 97 | (structure: C6H5—N=N—C6H4—N=N—[benzene with NHCH2-C6H4-OC7H15(n)]) | 0.77/Red (λmax 514 nm) m.p. 128.9–130° C. |
| 98 | (structure: C6H5—N=N—C6H4—N=N—[benzene with NHCH2-C6H4-C7H15(n)]) | 0.75/Red (λmax 515 nm) m.p. 102.3–103.0° C. |
| 99 | (structure: (n)H9C4O—C6H4—N=N—C6H4—N=N—[benzene with NHCH2-C6H4-OC7H15(n)]) | 0.76/Red |
| 100 | (structure: (n)H9C4O—C6H4—N=N—C6H4—N=N—[benzene with NHCH2-C6H4-OC7H15(n)]) | 0.78/Red (λmax 518 nm) m.p. 138.5–139.3° C. |
| 101 | (structure: (n)H9C4O—C6H4—COO—C6H4—N=N—[naphthalene with NHCH2-C6H4-OC4H9(n)]) | 0.75/Red |
| 102 | (structure: (n)H17C8—C6H4—COO—C6H4—N=N—[naphthalene with NHCH2-C6H4-C5H11(n)]) | 0.76/Red m.p. 99.5–100° C. |

TABLE 3-continued
| No. | Structural Formula | S/Hue |
|---|---|---|
| 103 | 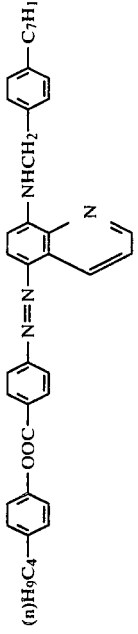 | 0.75/Red |
| 104 | 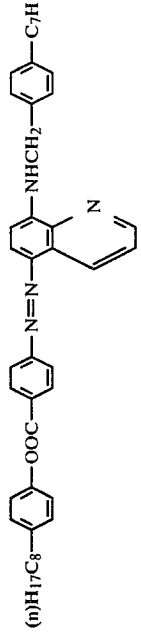 | 0.76/Red m.p. 121.0–121.5° C. |
| 105 | 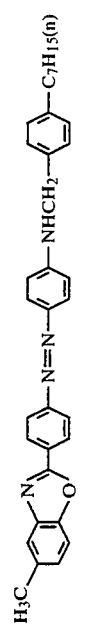 | 0.76/Yellow |
| 106 | 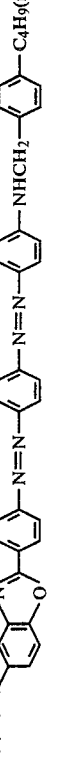 | 0.78/Red |
| 107 | 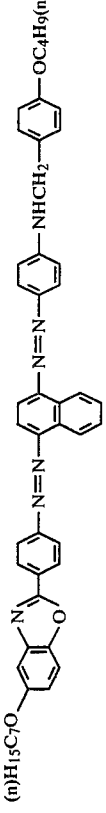 | 0.76/Red |
| 108 | 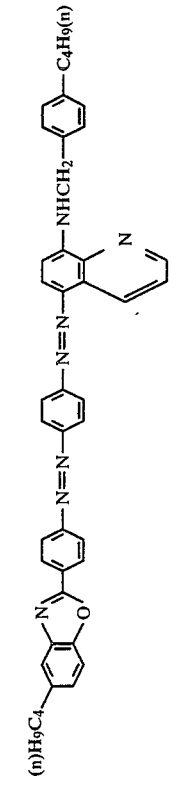 | 0.78/Red |
| 109 | 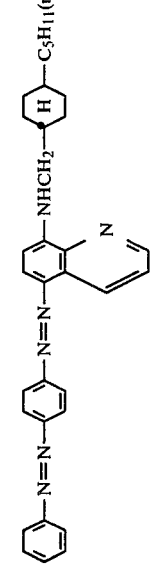 | 0.76/Red m.p. 138.5–139.5° C. |

TABLE 3-continued

| No. | Structural Formula | S/Hue |
|---|---|---|
| 110 | (structure) | 0.78/Red |
| 111 | (structure) | 0.77/Red |
| 112 | (structure) | 0.78/Bluish red |
| 113 | (structure) | 0.75/Bluish red |
| 114 | (structure) | 0.75/Red |
| 115 | (structure) | 0.77/Red ($\lambda_{max}$ 512 nm) m.p. 116.5–117.2° C. |

TABLE 3-continued

| No. | Structural Formula | S/Hue |
|---|---|---|
| 116 | (n)H₉C₄—⟨⟩—N=N—⟨⟩—NHCH₂—⟨⟩—C₇H₁₅(n) (with fused ring, N) | 0.76/Red (λmax 514 nm) m.p. 98.5–99° C. |
| 117 | (n)H₉C₄—⟨⟩—N=N—⟨⟩—OOC—⟨⟩—[naphthalene]—N=N—⟨⟩—NHCH₂—⟨⟩—OC₄H₉(n) | 0.78/Purple |
| 118 | (n)H₉C₄O—⟨⟩—N=N—⟨⟩—OOC—⟨⟩—[naphthalene]—N=N—⟨⟩(OH)—NHCH₂—⟨⟩—OC₇H₁₅(n) | 0.76/Purple |
| 119 | (n)H₉C₄—⟨⟩—N=N—⟨⟩—[naphthalene]—N=N—⟨⟩—NHCH₂—⟨⟩—OC₄H₉(n) | 0.79/Bluish purple |
| 120 | (n)H₁₇C₈OOC—⟨⟩—N=N—⟨⟩—[naphthalene]—N=N—⟨⟩—NHCH₂—⟨cyclohexyl H⟩—C₄H₉(n) | 0.79/Blue |
| 121 | (n)H₇C₃OOC—⟨⟩—N=N—⟨⟩(OCH₃)(CH₃)—[naphthalene]—N=N—⟨⟩—NHCH₂—⟨⟩—OC₇H₁₅(n) | 0.77/Blue |
| 122 | (n)H₇C₃OOC—⟨⟩—N=N—⟨⟩—[naphthalene]—N=N—⟨⟩(CH₃)—NHCH₂—⟨cyclohexyl H⟩—C₄H₉ | 0.77/Blue |
| 123 | F—⟨⟩—N=N—⟨⟩—[naphthalene]—N=N—⟨⟩—NHCH₂—⟨⟩—C₈H₁₇(n) | 0.78/Bluish purple |

TABLE 3-continued

| No. | Structural Formula | S/Hue |
|-----|-------------------|-------|
| 124 | (n)H₁₇C₈O₂S—⟨⟩—N=N—⟨naphthyl⟩—N=N—⟨⟩(CH₃)—NHCH₂—⟨⟩—C₅H₁₁(n) | 0.77/Blue |
| 125 | (n)H₉C₄—⟨⟩—N=N—⟨⟩—OOC—⟨⟩—N=N—⟨naphthyl⟩—NHCH₂—⟨⟩—OC₄H₉(n) | 0.79/Bluish purple |
| 126 | (n)H₉C₄—⟨⟩—CH₂HN—⟨⟩—N=N—⟨⟩—N=N—⟨⟩—NHCH₂—⟨⟩—C₄H₉(n) | 0.82/Red |
| 127 | (n)H₉C₄O—⟨⟩—CH₂HN—⟨⟩—N=N—⟨⟩(Cl,Cl)—N=N—⟨⟩—NHCH₂—⟨⟩—OC₄H₉(n) | 0.80/Red |
| 128 | (n)H₁₅C₇O—⟨⟩—CH₂HN—⟨⟩—N=N—⟨⟩(OCH₃,CH₃)—N=N—⟨⟩—NHCH₂—⟨⟩—OC₇H₁₅(n) | 0.83/Red (λmax 516 nm) m.p. 232–233° C. |
| 129 | (n)H₁₅C₇O—⟨⟩—CH₂HN—⟨⟩—N=N—⟨⟩(OCH₃,CH₃)—N=N—⟨⟩—NHCH₂—⟨⟩—OC₇H₁₅(n) | 0.80/Red |
| 130 | (n)H₁₁C₅—⟨⟩—CH₂HN—⟨⟩—N=N—⟨naphthyl⟩—N=N—⟨⟩—NHCH₂—⟨⟩—⟨⟩—C₅H₁₁(n) | 0.81/Red |
| 131 | (n)H₇C₃—⟨⟩—CH₂HN—⟨⟩(CH₃)—N=N—⟨naphthyl⟩—N=N—⟨⟩(CH₃)—NHCH₂—⟨⟩—C₃H₇(n) | 0.80/Purple |
| 132 | (n)H₇C₃—⟨cyclohexyl⟩—⟨⟩—CH₂HN—⟨naphthyl⟩—N=N—⟨⟩—N=N—⟨naphthyl⟩—NHCH₂—⟨⟩—⟨cyclohexyl⟩—C₃H₇(n) | 0.83/Blue |

TABLE 3-continued

| No. | Structural Formula | S/Hue |
|---|---|---|
| 133 | | 0.80/Purplish blue |
| 134 | | 0.81/Purplish blue m.p. 186–187° C. |
| 135 | | 0.82/Blue (λmax 611 nm) m.p. 226–226.7° C. |
| 136 | | 0.81/Purple (λmax 548 nm) m.p. 231.5–232° C. |
| 137 | | 0.80/Red |
| 138 | | 0.81/Bluish red |
| 139 | | 0.79/Bluish red |

TABLE 3-continued

| No. | Structural Formula | S/Hue |
|---|---|---|
| 140 | | 0.79/Red |
| 141 | | 0.81/Red |
| 142 | | 0.81/Bluish red |
| 143 | | 0.80/Red |
| 144 | | 0.82/Purple |
| 145 | | 0.80/Orange |
| 146 | | 0.78/Bluish red |
| 147 | | 0.75/Yellow |

TABLE 3-continued

| No. | Structural Formula | S/Hue |
|---|---|---|
| 148 | (structure) | 0.74/Yellow (λmax 455 nm) m.p. 228–229° C. |
| 149 | (structure) | 0.75/Yellow |
| 150 | (structure) | 0.78/Yellow |
| 151 | (structure) | 0.61/Purple |
| 152 | (structure) | 0.59/Blue (λmax 666 nm) m.p. 210.5–211° C. |

While the invention has been described in detail and with reference to specific embodiments thereof, it will be apparent to one skilled in the art that various changes and modifications can be made therein without departing from the spirit and scope thereof.

What is claimed is:

1. A liquid crystal composition containing azo dyes represented by the formula ($I_0$)

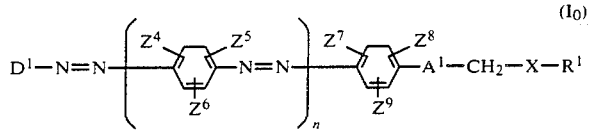

wherein X represents

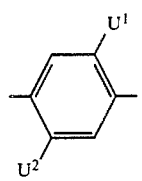

$A^1$ represents —NH—;

$R^1$ represents an alkyl group, an alkoxyalkyl group, an aryloxyalkyl group, a dialkylaminoalkyl group, an arylaminoalkyl group, an alkoxy group, an alkoxyalkoxy group, an arylalkoxy group, an aryl group, a halogen atom or a group of

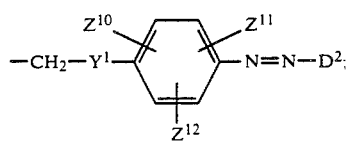

$D^1$ and $D^2$ each represents an aromatic group which does not contain an ionic group;

$U^1$ and $U^2$ each represents a hydrogen atom, a halogen atom, a methyl group, a methoxy group or an ethoxy group;

$Y^1$ represents —O— or

R represents a hydrogen atom, an alkyl group or an alkyl group connected to $Z^{10}$ to $Z^{12}$ to form a ring;

$Z^4$ to $Z^{12}$ each represents a hydrogen atom, a halogen atom, an alkyl group, an alkoxy group, a hydroxy group, an acylamino group or a cyano group, or $Z^4$ and $Z^5$, $Z^7$ and $Z^8$, and $Z^{10}$ and $Z^{11}$ may be connected to each other to form an aromatic ring; and n represents 0, 1 or 2; with the proviso that the dye does not contain a cyclohexyl group.

2. A liquid crystal composition as claimed in claim 1, wherein the azo dyes are the compounds represented by the formula (I-2)

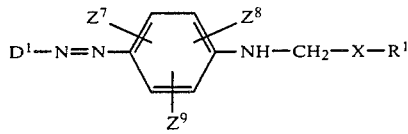

wherein $R^1$, X, $Z^7$ to $Z^9$ and $D^1$ are as defined in claim 1.

3. A liquid crystal composition as claimed in claim 2, wherein $U^1$ and $U^2$ each represents a hydrogen atom or a methyl group.

4. A liquid crystal composition as claimed in claim 2, wherein $D^1$ in the formula (I-2) is the group represented by the formula

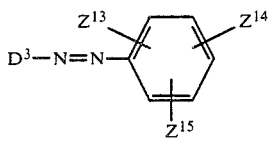

wherein $D^3$ represents an aromatic group which does not contain an ionic group; and $Z^{13}$ to $Z^{15}$ each represents a hydrogen atom, a halogen atom, an alkyl group, an alkoxy group, an acylamino group or a cyano group, and $Z^{13}$ and $Z^{14}$ may be connected to each other to form an aromatic ring.

5. A liquid crystal composition as claimed in claim 2, wherein $D^1$ in the formula (I-2) is the group represented by the formula

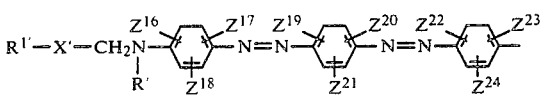

wherein X' represents

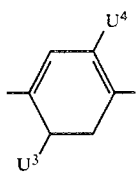

wherein $U^3$ and $U^4$ each represents a hydrogen atom, a halogen atom, a methyl group, a methoxy group or an ethoxy group;

$Z^{16}$ to $Z^{24}$ each represents a hydrogen atom, a halogen atom, an alkyl group, an alkoxy group, an acylamino group or a cyano group, and $Z^{16}$ and $Z^{17}$, $Z^{19}$ and $Z^{20}$, and $Z^{22}$ and $Z^{23}$ may be connected to each other to form an aromatic ring;

R' represents a hydrogen atom or an alkyl group, or an alkyl group connected to $Z^{16}$ to $Z^{18}$ to form a nitrogen containing group; and $R^1$ represents a hydrogen atom, an alkyl group, an alkoxyalkyl group, an aryloxyalkyl group, an alkylaminoalkyl group, a dialkylaminoalkyl group, an arylaminoalkyl group, an alkoxy group, an alkoxyalkoxy group, an aryl group or a halogen atom.

* * * * *